United States Patent
Hoover et al.

[11] Patent Number: 5,805,837
[45] Date of Patent: Sep. 8, 1998

[54] METHOD FOR OPTIMIZING REISSUE COMMANDS IN MASTER-SLAVE PROCESSING SYSTEMS

[75] Inventors: Russell Dean Hoover, Rochester; George Wayne Nation, Eyota, both of Minn.

[73] Assignee: International Business Machines Corporation, Armonk, N.Y.

[21] Appl. No.: 620,008

[22] Filed: Mar. 21, 1996

[51] Int. Cl.⁶ .................................................. G06F 13/14
[52] U.S. Cl. ............................................................ 395/290
[58] Field of Search .................................... 395/290, 287, 395/293, 296, 298, 306, 309

[56] References Cited

U.S. PATENT DOCUMENTS

| | | | |
|---|---|---|---|
| 5,191,649 | 3/1993 | Cadambi et al. .................. | 395/200.05 |
| 5,197,146 | 3/1993 | LaFetra ................................. | 395/471 |
| 5,237,696 | 8/1993 | Best ...................................... | 395/299 |
| 5,257,356 | 10/1993 | Brockmann et al. .................. | 395/290 |
| 5,276,899 | 1/1994 | Neches .................................. | 395/673 |
| 5,280,591 | 1/1994 | Garcia et al. ......................... | 395/291 |
| 5,283,902 | 2/1994 | Dorn ...................................... | 395/301 |
| 5,321,818 | 6/1994 | Wendling et al. ..................... | 395/290 |
| 5,594,882 | 1/1997 | Bell ................................... | 395/421.02 |
| 5,621,897 | 4/1997 | Boury et al. .......................... | 395/296 |

*Primary Examiner*—Glenn A. Auve
*Attorney, Agent, or Firm*—Merchant, Gould, Smith, Edell, Welter & Schmidt; Steven R. Funk

[57] ABSTRACT

A method for reissuing a command initiated by a master device to a slave device, where the slave device fails to process the command within a predetermined interval. The slave stores the command, including a master identifier used to identify the master device that initiated the command, at the slave device. The slave device arbitrates for control of the command bus when it becomes available to process the command. Upon receiving control of the bus, the slave device drives the stored command, including the master identifier, onto the command bus. It appears to the system that the master device reissued the command.

35 Claims, 9 Drawing Sheets

METHOD FOR OPTIMIZING REISSUE COMMANDS IN MASTER-SLAVE PROCESSING SYSTEMS

FIELD OF THE INVENTION

The present invention relates generally to master-slave processing systems. More particularly, the present invention relates to a method for increasing processing speed by reducing the time required to reissue commands to nonresponsive slave devices.

BACKGROUND OF THE INVENTION

Modern day computing systems often use multiple processors for obtaining greater processing speeds. The processors often share a common command bus, and arbitrate for control of the bus using a variety of arbitration techniques. Processors requesting actions to be performed by other devices are typically referred to as masters, and memory devices, I/O devices, and other processors function as slaves which communicate with the masters via the common command bus. A master/slave relationship functions so that a master initiates a request to a slave and the slave replies. Alternatively, slaves may be designed to simply carry out the request silently without a reply. At any instant, at most one chip can be master, although many can be slaves. A typical bus transaction comprises a microprocessor as master, requesting data from a memory device as slave.

Since the command bus can only transmit one command at a time, arbitration techniques must be used so that only one of the possible masters has control of the bus at a time. Various arbitration techniques can be used to allow only one master to control the bus at a time. These arbitration techniques can include fixed priority schemes, round-robin priority schemes, and other schemes. Whatever arbitration technique used, one master is typically granted permission to use the command bus while the other masters are forbidden to use the bus. The master currently using the bus is referred to as the requesting master or originating master, while the other masters are referred to as non-active masters.

One advantage of using multi-processor systems is that while a requesting master has control of the bus, the non-active masters can prepare to use the bus so that when the bus becomes available they may immediately use it. Furthermore, when a requesting master initiates a command to a slave, it is often advantageous for the requesting master to relinquish control of the bus to a different master, so that the bus is not tied up during the time that the slave is processing the command. This provides for high efficiency of the common bus, and allows the system to operate more efficiently which results in higher system speeds.

It is often the case that a slave that is targeted to perform an action cannot process a command in a given time interval. The slave may currently be busy so that it cannot act on another command, or the slave may have a slow response time which would delay the slave's processing of the command. Multi-processor buses having such fixed-tenure response windows typically have mechanisms for stalling bus commands when the slave cannot process the command in the given time interval. In prior art systems, the slave that stalled the command will eventually give some indication back to the active master that the command can be reissued. At that point, the active master re-arbitrates for the bus and reissues the command. The problem is that the bus slave must arbitrate for the command bus before placing the reissue command on the bus, and then the bus master must re-arbitrate for the bus after receiving the reissue command. For large multi-processor systems, these multiple arbitration cycles can be 100 or more nanoseconds.

Such a prior art system is described in U.S. Pat. No. 5,257,356 issued to Brockmann et al. issued on Oct. 26, 1993. The Brockmann et al. patent describes a system wherein the masters arbitrate to win control of the bus, and the winning master then sends a command to a slave. The selected slave then signals the winning master that it should relinquish control of the bus when the selected slave is either unavailable to service a request issued by the winning master, or is unable to complete the requested service within the calculated or predetermined period of time. The winning master then relinquishes control of a bus, and when the selected slave either becomes available to service the request, or has completed the requested service, the slave arbitrates for bus control on the relinquished master's behalf. The slave performs this by storing a unique arbitration code associated with the relinquished master, and placing the relinquished master's arbitration code on the bus when the slave becomes available or completes the requested service. The relinquished master then detects that its arbitration code has been placed on the bus, and begins to arbitrate with the other masters for bus control. Once the relinquished master again obtains bus control, it reissues to the selected slave the request that it had previously issued. Such a system requires an arbitration time for the slave to arbitrate to place the arbitration code on the bus, and requires an additional time for the relinquished master to arbitrate for the bus to reissue the command.

Other systems do not allow the slave to arbitrate for the master at all, but rather will indicate to the master by other mechanisms that the master should continue to send the command until the slave is available to process the command. The master therefore continually drives the command onto the bus, which requires additional bus bandwidth, and ultimately reduces overall system speed.

It is therefore desirable to reduce the time required to reissue a command from the master to the slave in a situation where the slave has stalled the bus command due to the slave being slow or busy. The present invention reduces the time required to reissue a command by reducing arbitration delays in such a situation. The present invention therefore provides a solution to this and other problems, and offers other advantages over the prior art.

SUMMARY OF THE INVENTION

The present invention relates to a method for increasing processing speed in a computer processing system by reducing the time required to reissue commands to nonresponsive slave devices.

In accordance with one embodiment of the invention, a method of reissuing a command initiated by a master device to a slave device is provided. Where a slave device fails to process the command issued by the master device within a predetermined interval, the slave device will store the command. The command includes a master identifier used to identify the master device that initiated the command. When the slave device becomes available to process the command, the slave device itself arbitrates for control of the command bus. Upon receiving control of the bus, the slave device drives the stored command, including the master identifier, onto the command bus.

These and other features and advantages of the present invention will become readily apparent to those skilled in the art from the following detailed description and corresponding drawings. As will be realized, the invention is capable of modification without departing from the invention. Accordingly, the drawing and description are to be regarded as illustrative in nature, and not as restrictive.

DETAILED DESCRIPTION OF THE PREFERRED EMBODIMENTS

Figure 1:
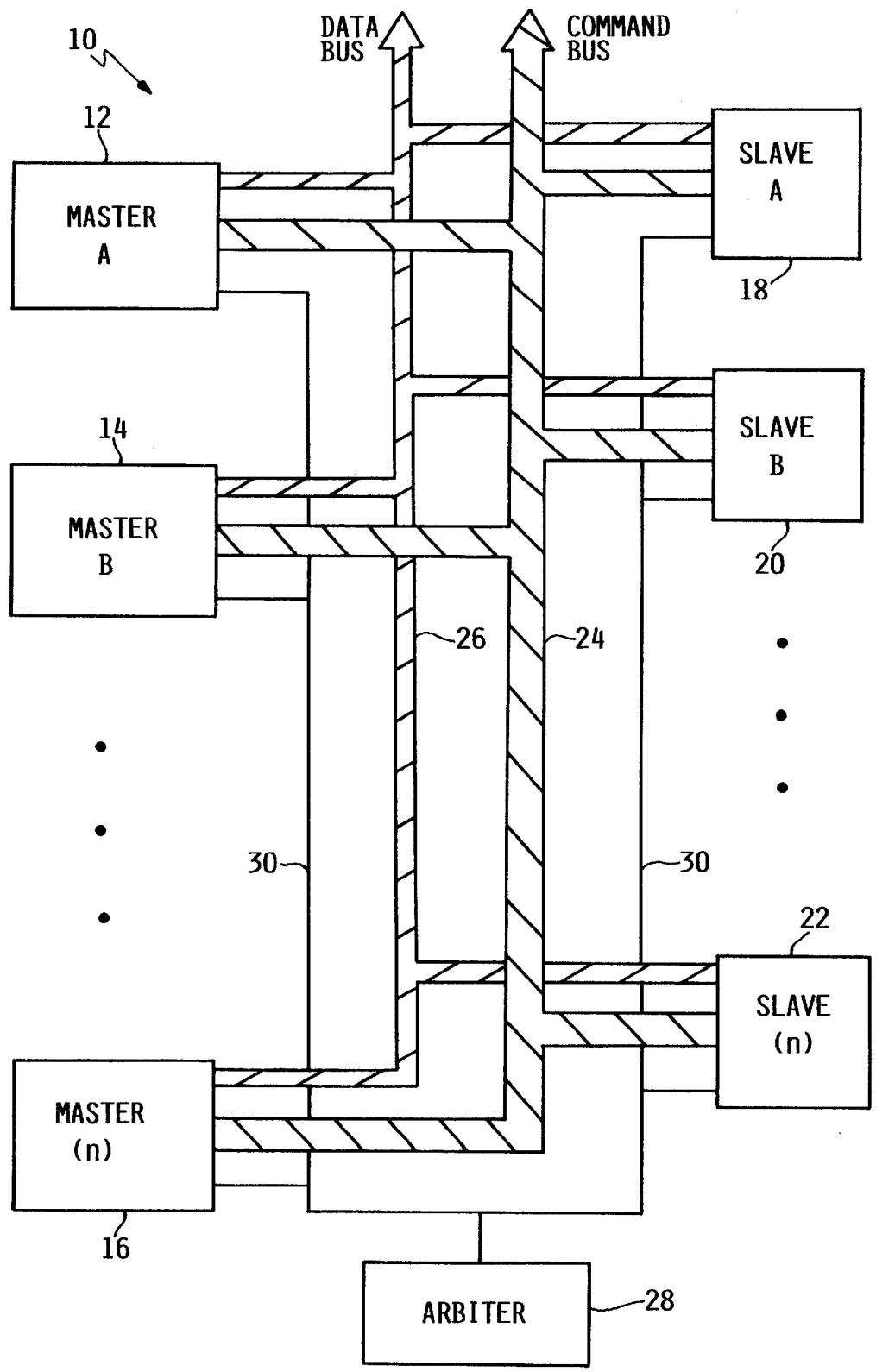
FIG. 1 is a block diagram of a processing system implementing the present invention.

FIG. 1 shows a block diagram of a processing system 10. Processing system 10 includes a plurality of master devices, shown in FIG. 1 as master A 12, master B 14, through master (n) 16. A master device, typically a processor, represents a device that requests actions to be performed by other devices, commonly referred to as slave devices. FIG. 1 shows a plurality of slave devices, including slave A 18, slave B 20, through slave (n) 22. The masters can also act as slaves, since the requesting master can request an action to be taken by another master. It is also possible for a processing system 10 to exist having only one master and only one slave, where any functions not performed by the master will be performed by the slave at the request of the master. The slaves (slave A 18, slave B 20, through slave (n) 22) are common devices such as memory devices, I/O devices, and other peripheral components. A master/slave relationship operates so that a master initiates a request to the slave and the slave replies. At any instant, at most one chip can be the master, although may can be slaves.

In order for a master to communicate a request to a slave, the master needs to transmit a command. The command typically includes an instruction for the slave to carry out, and an address of the slave from which the action is requested. An address to a memory device will include an address of a particular memory location in the memory device. The means by which an instruction and an address is transmitted from a master to a slave is by way of a command bus 24 which is connected between each of the masters and slaves. A data bus 26 is also connected between the masters and slaves to provide a path for which data can be transmitted. It is often the case where the instruction sent by the master to slave is one in which data is being written to, or read from, one of the slave devices (or a master device acting as a slave).

In a system such as processing system 10 having multiple masters desiring access to the command bus, a method is required for granting bus access to only one master at a time. This function is provided by arbiter 28, which resolves simultaneous bus requests. More specifically, the arbiter receives bus requests on control bus 30, utilizes an arbitration technique to determine which of the requesting masters will be allowed access to the bus, and then transmit a bus grant signal to one of the requesting masters to indicate that it has control of the command bus 24. It should be noted that arbiter 28 need not be a centralized arbiter, but rather the arbitration duties could be distributed among the master themselves.

It is often the case that a slave that is targeted cannot process a command at a given time interval. The slave may currently be busy so that it cannot act on another command, or the slave may have a slow response which would delay the slave's processing of the command. Prior art systems often require that the master reissue the command at a time when the slave becomes available. This may require the slave to indicate to the requesting master that it is busy, and requires the slave to provide a retransmit signal to the master when the slave becomes available. The requesting master would then re-arbitrate for control of the bus, and reissue the command. The present invention reduces the time required to reissue the command from the time the slave becomes available.

Figure 2:
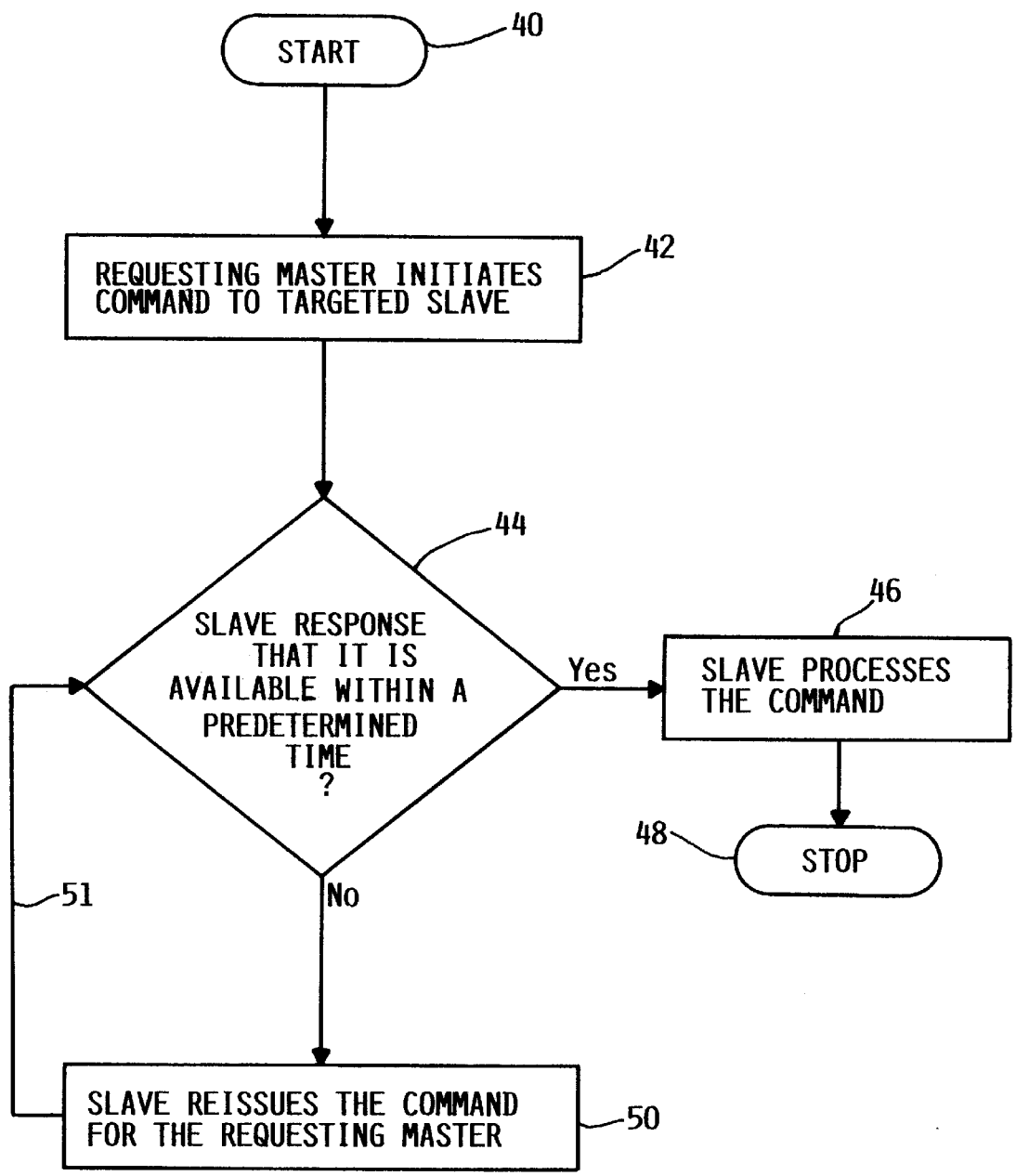
FIG. 2 is a flow diagram of the primary steps taken in the master/slave request cycle.

FIG. 2 is a flow diagram of the major steps taken in the master/slave request cycle. The process, which starts at step 40, first involves a request from a master to initiate a command to a targeted slave at step 42. It should be recognized that the command bus is a shared bus, and therefore the command is not directly sent to only one slave. However, the addressing in the command will allow one or more of the slaves to recognize the command. At step 42, the master transmits a bus request signal to an arbiter such as arbiter 28 of FIG. 1. When the requesting master receives control of the bus, processing continues at decision step 44 where it is determined whether the slave responded as to its availability to process a command within a predetermined interval. Where multiple slaves are targeted, any of the slaves may fail to provide a slave response in the predetermined interval. Also, other slaves may need to provide a slave response even though they are not "targeted" by the master. Such a case is where the slaves are providing a snoop response to indicate whether they are storing cached data at a particular address. Snoop responses will be described more fully in the description of FIGS. 7 through 11.

If the slave responds within the predetermined time interval to the requesting master's request at decision step 44, processing continues at step 46, where the slave processes the command. The process would then be completed, as indicated by stop step 48. However, if the slave did not respond within the predetermined time, processing continues at step 50, which involves the reissuing of the command by the slave for the requesting master. Processing then continues normally at decision step 44, as though the requesting master reissued the command. This processing path is shown by feedback line 51.

Figure 3:
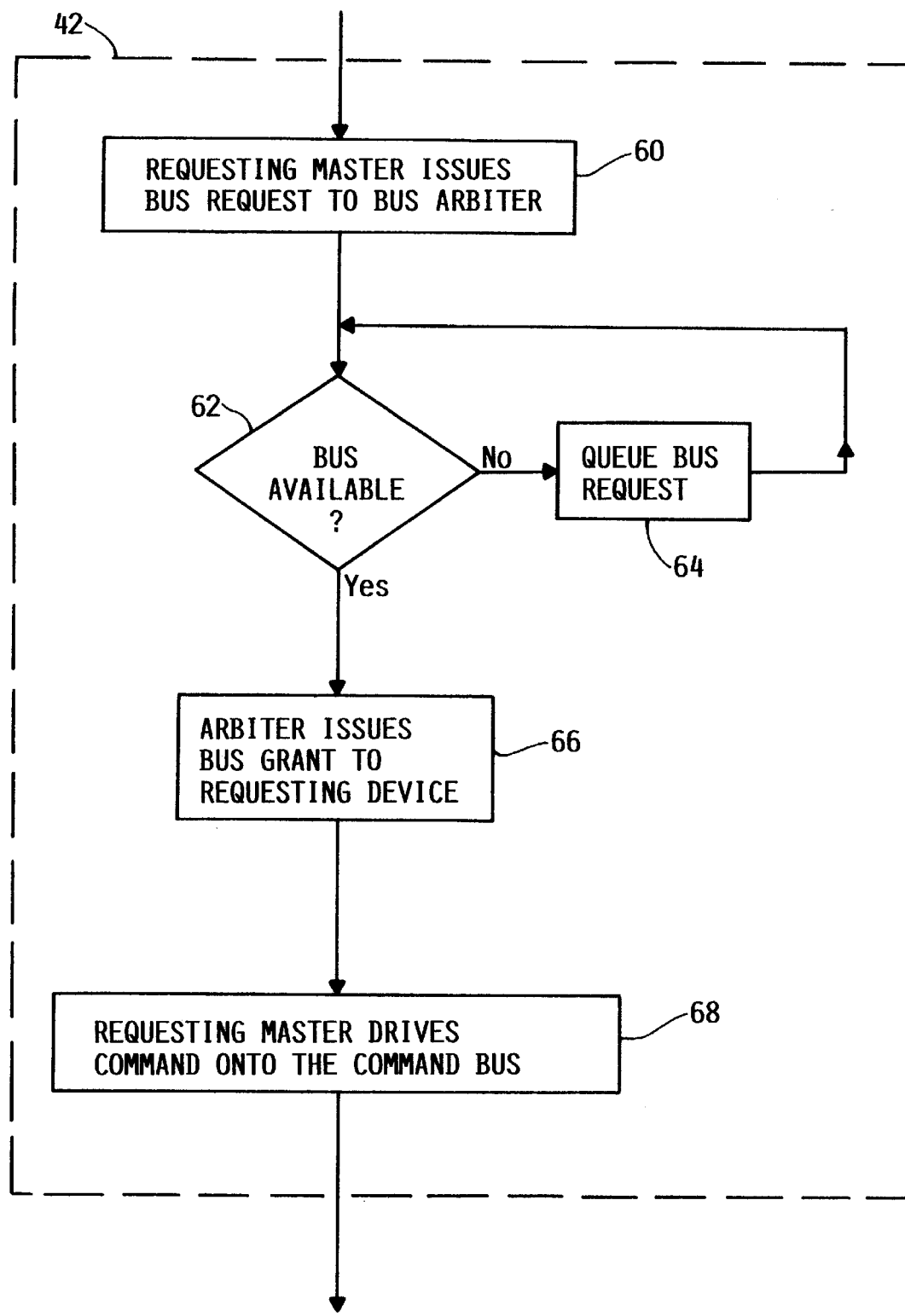
FIG. 3 is a flow diagram setting forth the steps involved in a master's initiation of a command to a targeted slave.

Referring now to FIG. 3, a flow diagram is shown detailing the events of step 42, which involve the step of initiating a command by a requesting master to the targeted slave. The first step taken by the master is shown in step 60 where the requesting master issues a bus request to the bus arbiter. The bus arbiter then determines whether the bus is available at decision step 62. If the bus is not available, the bus requests can be queued at step 64 until the bus becomes available. If the bus is currently available, the arbiter will issue a bus grant to the requesting master at step 66.

Processing continues at step 68, where the requesting master drives the command onto the command bus. Processing then continues at decision step 44 of FIG. 2.

Figure 4:
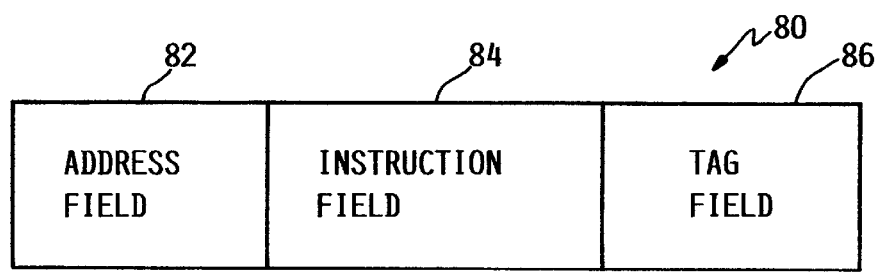
FIG. 4 is a diagram depicting the fields of a command.

FIG. 4 is a diagram of a typical command 80 that is issued in the processing system 10 of the preferred embodiment. Within this command is an address field 82, which holds an n-bit address of the targeted slave. When this address is issued on the command bus 24, address decode circuitry (not shown), which is well known in the art, decodes the address and enables one or more of the slave devices. Also included in command 80 is an instruction field 84 which holds the instruction to be performed by the slave. Typical instructions include a memory read instruction, and a memory write instruction. Bit patterns in the instruction field correspond to different instructions to be executed by a slave.

A tag field 86 is also included in the command 80. The tag field provides a method of indicating which master made a request, and further identifies which of a plurality of commands the present command is.

Figure 5:
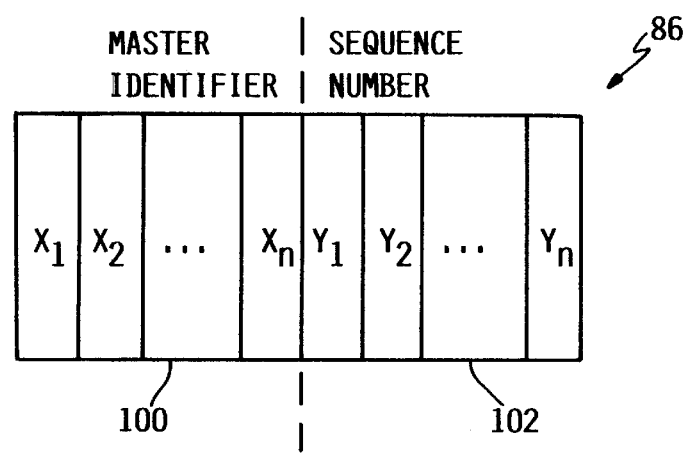
FIG. 5 is a detailed diagram of the tag field of the command.

Referring now to FIG. 5 the tag field 86 is shown in more detail. Tag field 86 includes a master identifier segment 100, and a sequence number segment 102. The master identifier segment 100 includes one or more bits labeled $x_1$, $x_2$, through $x_n$. Each master is assigned an identification number, and the requesting master inserts its identification number in the master identifier segment 100. The number of bits $x_1$ through $x_n$ that are required depends on the number of masters in the system, and also depends on the technique used to identify a particular master. For example, each bit $x_1$ through $x_n$ may represent a different master so that a master would assert a particular bit at a bit position to identify itself. If there were four masters in a system, this would require four bits in the master identifier segment 100. Another method, which is more economical in the use of bit positions, is to have the master identified by a binary pattern of bits in the master identifier segment 100. Using this method, four bit positions could identify sixteen different masters.

The sequence number segment 102 also provides one or more bits labeled $Y_1$, $Y_2$ through $Y_n$. The sequence number segment 102 is required because a given master may have driven more than one command onto the command bus at different times, where those commands are still pending. For instance, a particular master may have issued a command 80 having a master identifier of 001 and a sequence number of 001 which has not yet been responded to by the targeted slave. A subsequent command 80 having a master identifier of 001 would increment its sequence number to 010 so that a targeted slave would know which command it is responding to. This will be described in further detail in connection with FIG. 6.

Figure 6:
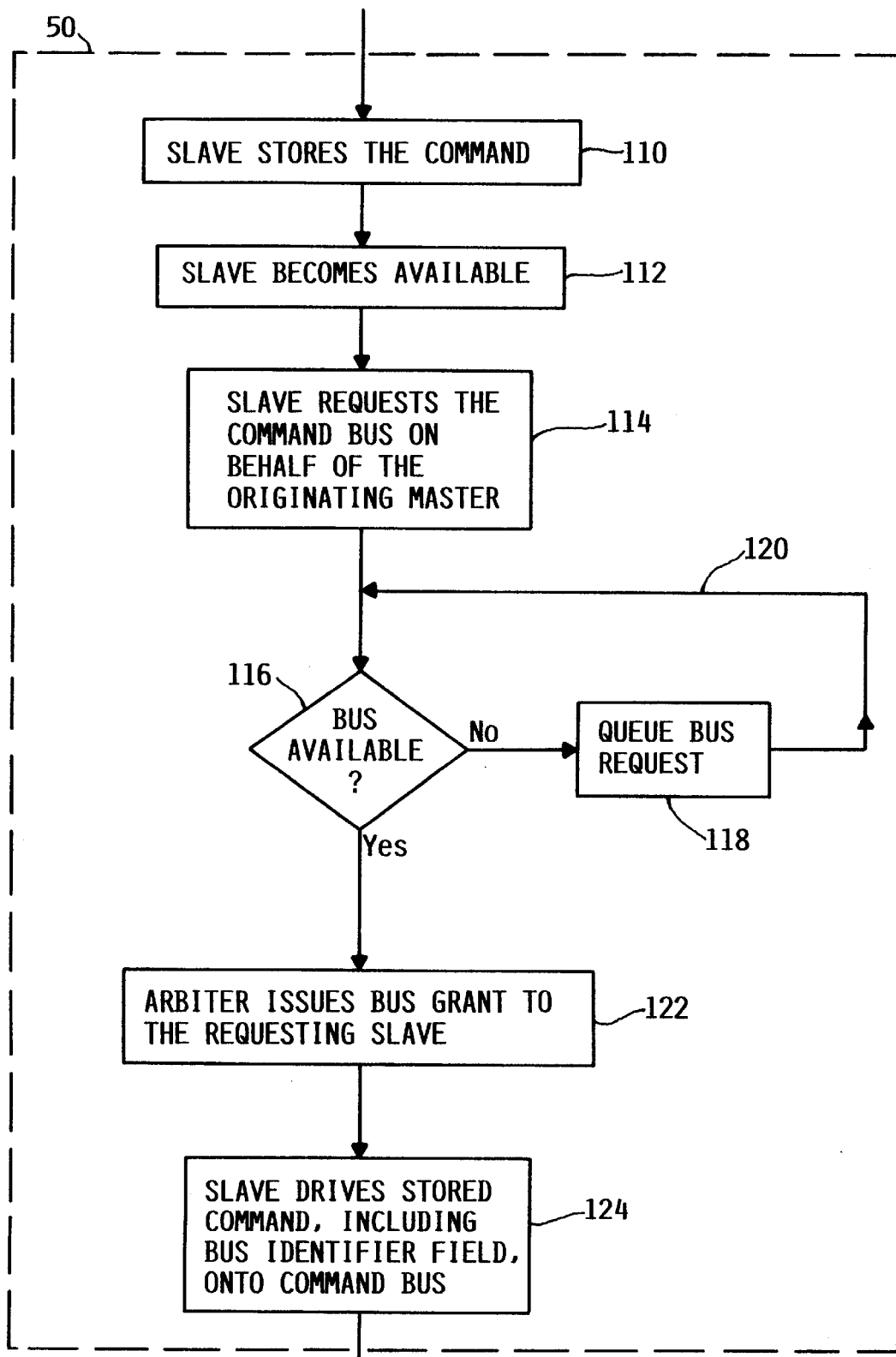
FIG. 6 is a flow diagram depicting the steps taken by the targeted slave in reissuing the command for the requesting master.

FIG. 6 is a flow diagram depicting the steps taken by the targeted slave when it reissues the command for the requesting master as provided for in step 60 of FIG. 2. When the slave devices has failed to process the commands (or alternatively failed to respond to the command) within a predetermined interval, the command must be reissued. The present invention allows the command to be reissued from the targeted slave device, where the slave arbitrates for control of the bus rather than having the master arbitrate, and puts the command on the bus itself, which reduces overall processing delays. Referring now to step 110 of FIG. 6, the slave stores the command 80 as originally initiated by the requesting master. The command is stored in a register when it determines that it cannot respond or process the command within the predetermined interval. When the slave becomes available in step 112, the slave requests control of the command bus 24 on behalf of the originating requesting master in step 114. The manner in which the slave becomes available depends upon the particular implementation. For instance, the slave may become available when the slave is no longer processing another command. In the preferred embodiment of the invention, step 112 indicates that a slave has responded to a snoop request, which will be more fully described in the description of FIGS. 7 through 11.

The request by the slave for the command bus is made by way of a bus request to the arbiter 28, which determines whether the bus is available at decision step 116. If the bus is not available, the request can be queued at step 118 until the bus becomes available as indicated by feedback line 120. If the arbiter determines that the bus is available at decision step 116, the arbiter issues a bus grant to the requesting slave at step 122. Once the slave has obtained control of the bus, step 124 shows that the slave will drive the commands stored at step 110, including the master identifier and sequence number of tag field 86, onto the command bus 24.

By allowing the targeted slave to drive the command, as originally issued by the requesting master, the requesting master does not have to re-arbitrate for the command bus after receiving notification from the targeted slave that the slave is available to process the command. The slave is essentially performing the duties of the requesting master for the requesting master, and the slave will appear to all other masters and slaves on the command bus 24 to be the requesting master during that time. In other words, when the slave returns the stored command 80 to the command bus 24, the address in the address field 82 will be the address of itself—the targeted slave. The instruction in the instruction field 84 will be the same instruction as was originally issued by the requesting master. Finally, the master identifier and sequence number in the tag field 86 will not identify the targeted slave, but will identify the requesting master and original command. Therefore, rather than delaying the process by having the targeted slave indicate to the requesting master that it is available for processing, and then requiring the requesting master to re-arbitrate for the command bus and reissue the command, the slave performs these functions directly.

A command 80 is reissued rather than having the targeted slave simply process the command when it becomes available. This is because the requesting master, as well as other masters and slaves on the command bus 24, may have to account for timing considerations. The requesting master must know what it is that the targeted slave is providing, and therefore the targeted slave cannot simply perform the command 80 at any time and arbitrarily take an action (e.g., put data on the data bus 26) without the requesting master and the other devices being aware of what the action is and when it is scheduled to transpire. By reissing the command 80 as herein described, all devices coupled to the command bus 24 will react as if the requesting master issued the command 80, and when the targeted slave has completed processing the command, the requesting master can proceed in an organized manner.

Figure 7:
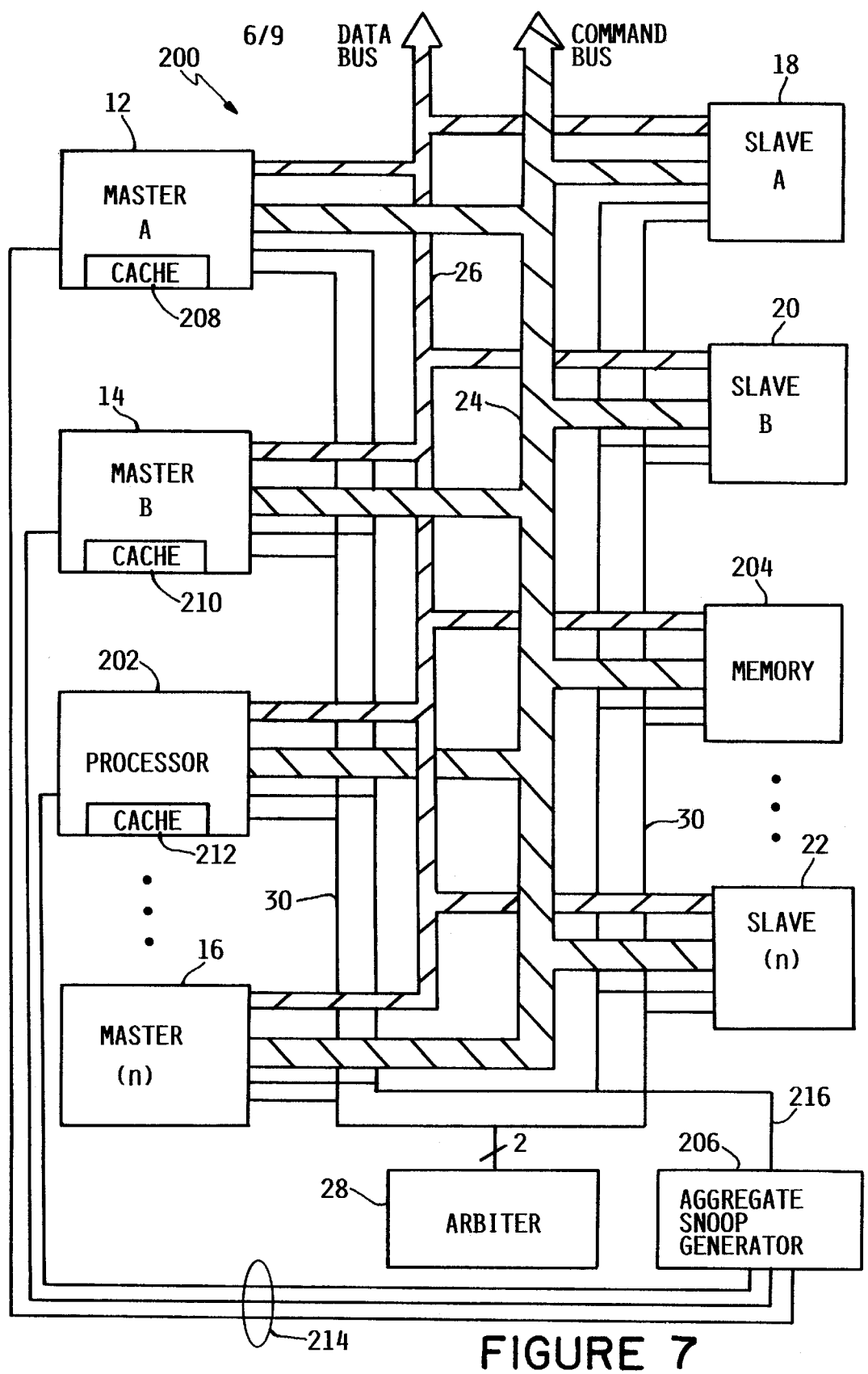
FIG. 7 is a block diagram of a cached processing system implementing the present invention.

FIG. 7 shows a cached processing system 200, in which the present invention is particularly useful. Cached processing system 200 is similar to processing system 10 in that it includes a plurality of masters A 12, B 14, through master (n) 16, and a plurality of slaves A 18, B 20, through slave (n) 22. One of the master devices in cached processing system 200 is processor 202, and one of the slaves is memory device 204. Cached processing system 200 also includes command bus 24, data bus 26, arbiter 28, and an aggregate snoop generator 206. Again, it should be noted that arbiter 28 need not be a centralized arbiter, but rather the arbitration duties could be distributed among the master themselves.

Some of the master devices in cached processing system 200 may include a data cache, as depicted by caches 208, 210 and 212. These caches are high-speed memory buffers situated between the master devices and the slave devices. They operate on the principle that certain memory locations tend to be accessed very often (normally for read instructions), and when that memory location is read, it is stored in the cache at the same time. This allows for fast data access when that memory location is subsequently accessed and the data is stored in the data cache. When a request is made to read data from, or write data to, a memory such as memory 204, the cached processing system 200 must first determine whether any of the cache devices 208, 210 and 212 are storing data at the desired memory location. For example, if a master such as processor 202 wants to read data from memory device 204, the system must first check to make sure that the data at this memory location has not been modified at one of the caches. Similarly, if processor 202 wants to write data to memory device 204, the system must ensure that cached data at that address is invalidated. In order to perform this checking function, cached processing system 200 utilizes a cache "snoop" function.

The cache snoop function is required for each device containing a cache. A device with a cache monitors the command bus 24 for a data transfer request at a memory location that is currently in its cache. Therefore, when a command 80 is driven onto the command bus 24, every device supplies a snoop response within a predetermined interval indicating whether it currently has data at the memory location included in the targeted address. If the particular device does not have data at the memory location, it returns a "null" signal, and if the device does have data at the memory location, it returns a signal indicating so.

The snoop response signals, which are shown on lines 214, are not returned to the requesting master however. Instead, an aggregate snoop generator 206 collects all of the snoop response signals and combinatorially produces one aggregate snoop response on line 216, which is driven back to every device on the command bus 24. If every device returns a null signal, the aggregate snoop response on line 216 will also be "null", which indicates that the memory device 204 will supply the data on a read command, and the caches do not invalidate any data on a write command. If any snoop response indicates that it currently has data at the memory location, the aggregate snoop response from the aggregate snoop generator 206 will provide a signal on line 216 that indicates to the devices that a memory location match exists within a cache. On a read command, this will result in the memory 204 recognizing that it will not provide the data but rather a cache will provide the data, and it also indicates to the requesting master that a cache, rather than memory 204, will be providing the data. On a write command, this will result in the caches invalidating any data at that memory location. It should be noted that the aggregate snoop generator 206 need not be separate from the masters, but rather could be implemented as part of the masters' processing functions.

In a system such as cached processing system 200, the present invention is very useful. If any of the cached devices (master A 12, master B 14 and processor 202 in FIG. 7) fail to return a snoop response signal on lines 214 within a predetermined interval, the command can be reissued from that nonresponding device. The nonresponding device is typically a slave device which could not generate its snoop response signal in the predetermined interval. It should be noted that when a master such as processor 202 is the requesting master, the other devices which are ordinarily master devices (master A 12, master B 14 through master (n) 16) may act as slaves. The nonresponding device stores the command 80, and arbitrates for control of the command bus 24 when it completes its determination of whether it includes cached data at the targeted memory location. It then drives the stored command back onto the command bus 24. It is necessary to reissue the command 80, because cached data could have changed in a device between the time it provided its snoop response signal on lines 208, and the time the nonresponding device completed its determination of whether it included cached data at the targeted memory location. The invention allows the nonresponding device to directly reissue the command for the requesting master, rather than signalling to the master that the nonresponding device is ready, requiring the master to re-arbitrate for the command bus 24, and reissue the command itself.

Figure 8:
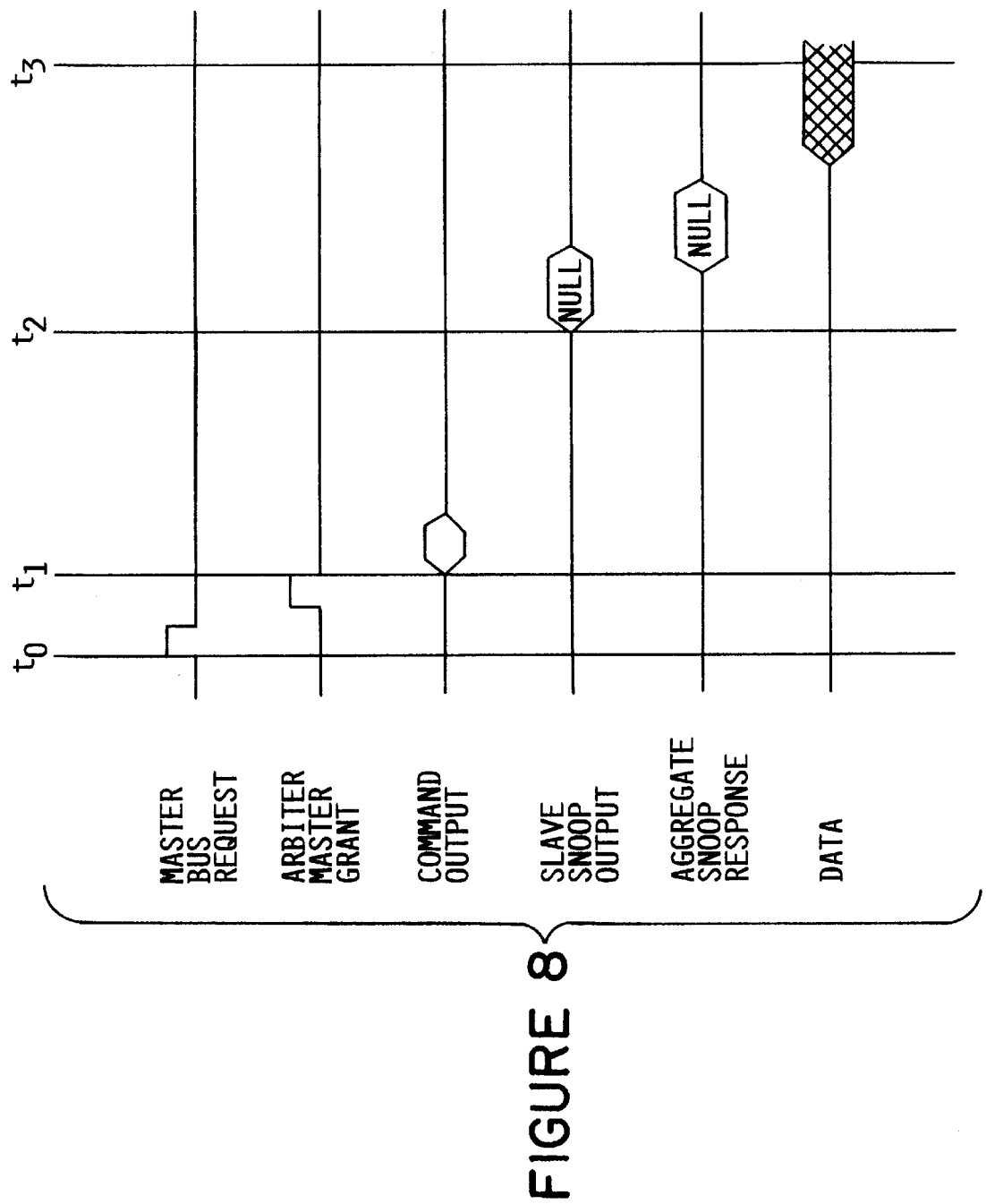
FIG. 8 is a timing diagram of a data transfer in a cached processing system that does not require a command reissue.

Referring now to FIG. 8, the timing of a data transfer requiring no command reissue is shown. At time $t_0$, the master bus request is issued from a requesting master, and the arbiter subsequently provides an arbiter master grant. At time $t_1$, the requesting master outputs the command 80 onto the command bus 24. The slave snoop responses must be received by the aggregate snoop generator 206 at time $t_2$, or the command 80 must be reissued. As shown in FIG. 8, a slave snoop response does occur at time $t_2$, which is a null signal. The aggregate snoop response signal is subsequently returned, and the data can then be transferred.

Figure 9:
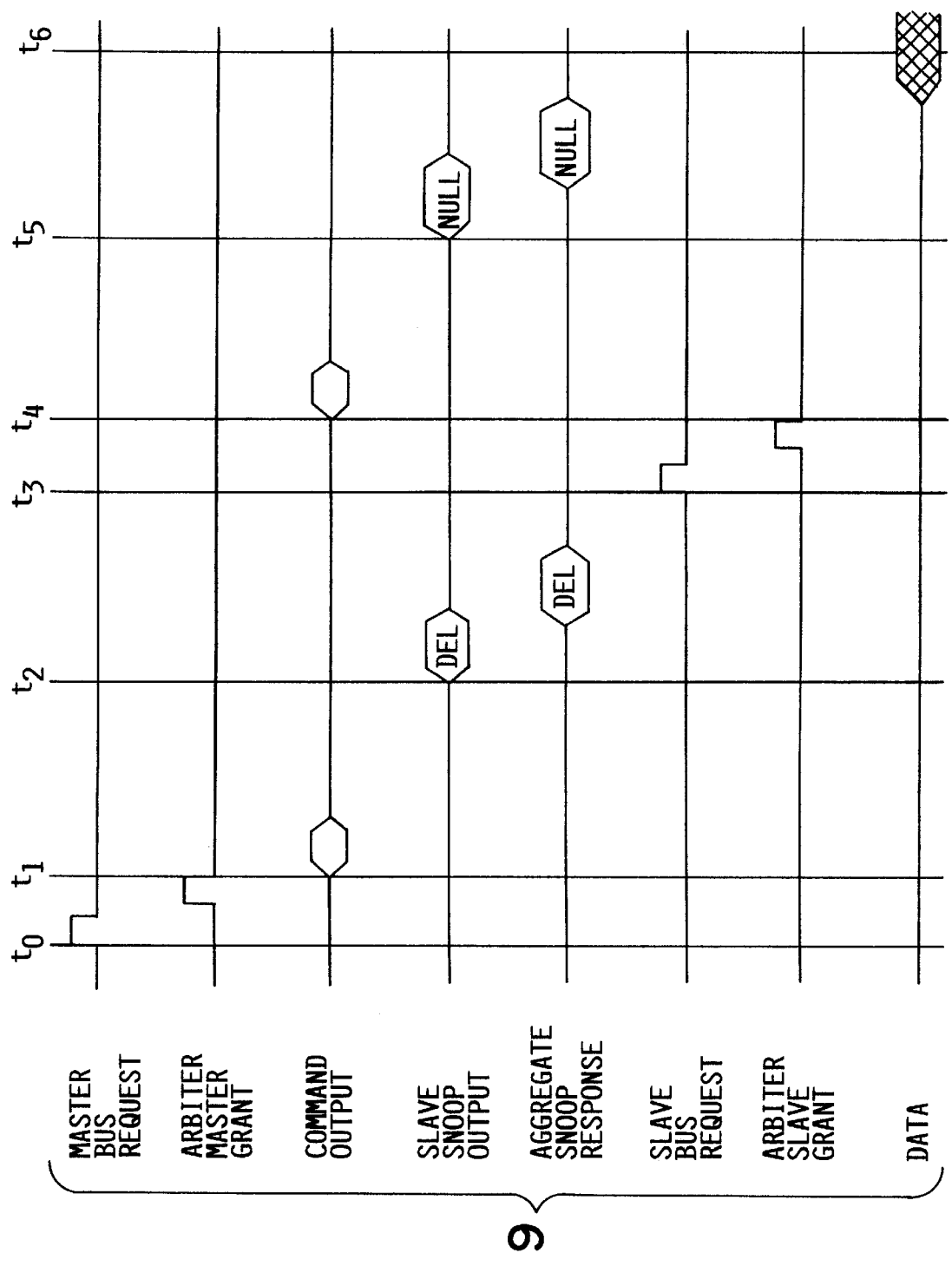
FIG. 9 is a timing diagram of a data transfer in a cached processing system that requires a command reissue.

Referring now to FIG. 9, the timing of a data transfer which requires a command reissue is shown. At time to, the master bus request is issued from a requesting master, and the arbiter subsequently provides an arbiter master grant. At time $t_1$, the requesting master outputs the command 80 onto the command bus 24. In this example, the slave snoop output can not generate a snoop response signal within the predetermined interval, and therefore outputs a delay signal at time $t_2$. Alternatively, the slave could output nothing at all, and the aggregate snoop generator 206 would detect this. The aggregate snoop response then distributes a delay signal to all of the devices on the command bus 24, indicating that the command 80 will be reissued. When the nonresponding slave becomes available, it then issues a slave bus request at time $t_3$ to the arbiter 28, which returns an arbiter slave grant signal when the bus becomes available. The nonresponding slave then puts the command 80 back on the command bus 24 at time $t_4$, where the slave snoop responses must again be received by the aggregate snoop generator 206 at time $t_5$ or the command 80 must again be reissued. At time $t_5$, a null slave snoop response occurs, the aggregate snoop response signal is subsequently returned, and the data can then be transferred.

Figure 10:
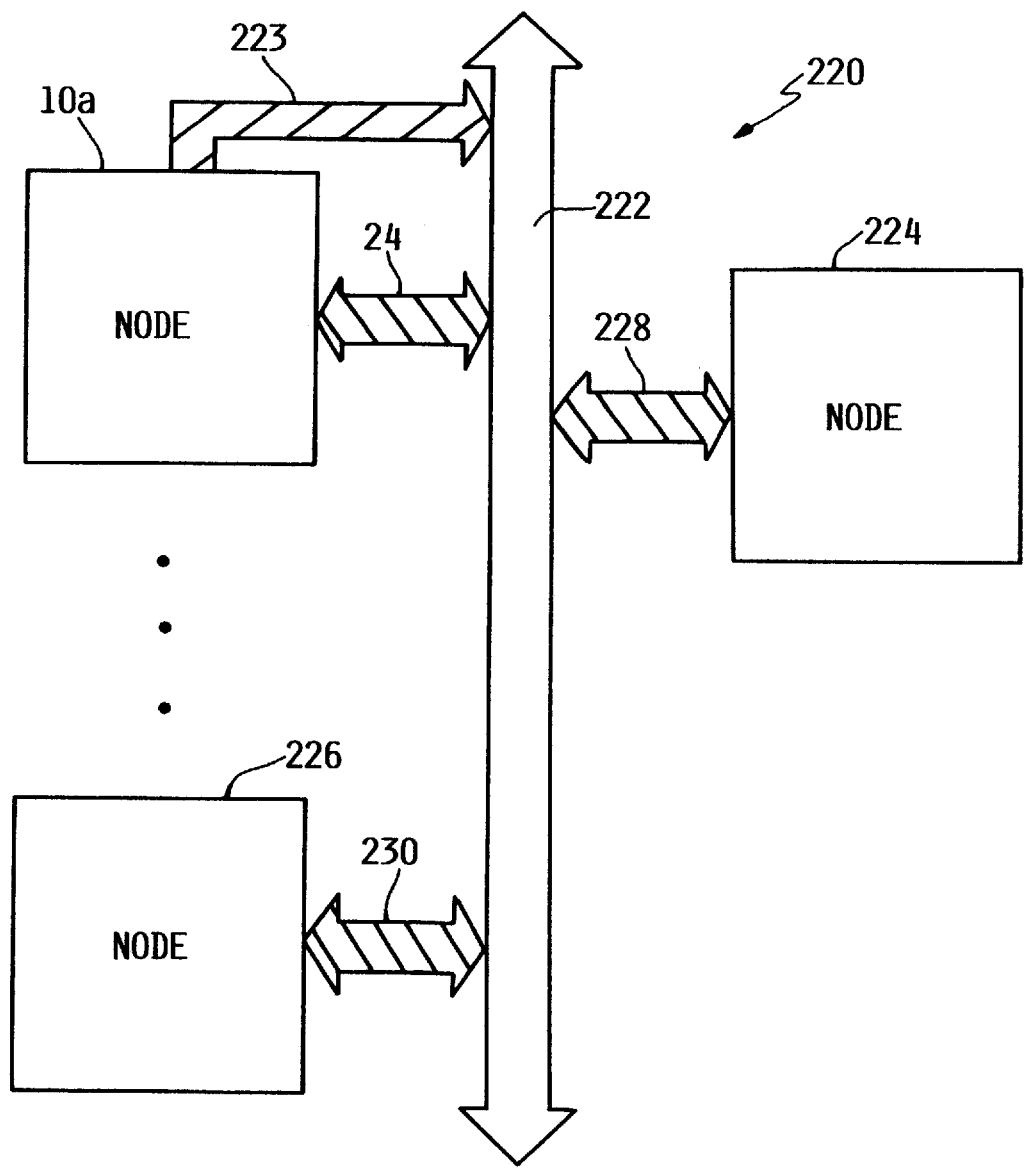
FIG. 10 is a block diagram of an interconnected processing system implementing the present invention.

Referring now to FIG. 10, processing systems such as processing system 10 may be bridged together to form a larger interconnected processing system 220. Processing system 10, referred to as node 10a, is coupled to a bridge bus 222 by way of its command bus 24, or alternatively through an independent command bus 223 which is separate from the local command bus 24. The independent command bus 223 would be used by a master, such as master 12 of FIG. 7, to transmit and receive commands from the bridge bus 222. In the preferred embodiment of the invention, independent command bus 223, rather than command bus 24, transmits and receives commands from the bridge bus 222. Other processing systems, referred to as nodes 224 and 226, can be coupled to the bridge bus 222 via command buses 228 and 230 respectively. The interconnected processing system 220 allows masters and slaves to communicate with each other across the bridge bus 222.

Bridge bus 222 of FIG. 10 is shown and described as a shared command bus. However, nodes 10a, 224, 226, and any other nodes can be similarly coupled to other topologies, such as network topologies. Examples of such other topologies include, among others, star, ring, mesh, hypercube, omega and lambda topologies.

In a system such as the interconnected processing system 220, the present invention is again very useful. A master in one processing system, for example node 10a, can read data from, and write data to, devices in nodes 224 and 226. It is even more likely that a snoop response will be unable to be generated within the predetermined interval, due to the additional interconnections and control required.

In the interconnected processing system 220, a data transfer command is initiated at a requesting master. For example, node 10a can initiate a command on its command bus 24, across the bridge bus 222, to the command bus 228, to a targeted slave in node 224. The devices having data caches in node 224 must provide a snoop response signal within the predetermined interval, after determining whether their respective data caches have data at the memory location indicated by the targeted address. If the snoop response can not be generated within node 224 in the predetermined interval, the command must be reissued. Because such an interconnected system may have a large number of command reissues, the processing speed of such an interconnected system can be increased by reissuing the command at the nonresponding device, as defined herein.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the following claims.

What is claimed is:

1. A method of reissuing a command initiated by a master device to a slave device on a command bus, the method comprising the steps of:
    (a) storing the command initiated by the master device, including a master identifier to identify the master device that initiated the command, at the slave device when the slave device fails to process the command within a predetermined time interval;
    (b) arbitrating, by the slave device, for the command bus upon availability of the slave device to process the command; and
    (c) driving the command stored by the storing step, including the master identifier, onto the command bus.

2. The method of claim 1, wherein the step of driving the command comprises the step of driving an instruction, an address, and the master identifier onto the command bus, wherein the instruction, the address, and the master identifier are equivalent to an original instruction, an original address, and an original master identifier originally initiated by the master device.

3. The method of claim 2, further comprising the step of allowing the master device to proceed as if the master device itself, rather than the slave device, had driven the command stored by the storing step onto the command bus.

4. The method of claim 1, further comprising the step of setting the master identifier stored by the storing step to equal an original master identifier of the master device.

5. The method of claim 1, wherein the step of storing the command comprises the step of storing the master identifier in a tag field of the command.

6. The method of claim 5, wherein the step of storing the command further comprises the step of storing a command sequence number, along with the master identifier, in the tag field of the command, wherein the command sequence number corresponds to a particular one of a group of one or more commands initiated by the master device.

7. The method of claim 1, wherein the step of arbitrating comprises the steps of requesting control of the command bus from an arbiter, and receiving a bus grant from the arbiter when the command bus becomes available.

8. The method of claim 1, further comprising the step of determining whether the slave device is available to process the command, and wherein the step of arbitrating comprises the step of allowing the slave device to arbitrate for the command bus subsequent to a determination that the slave device is available to process the command.

9. A method for optimizing command reissues in a computer system having one or more master devices, one or more slave devices, and a command bus coupled to each of the master and slave devices for transmitting commands from the master devices to the slave devices, the method for optimizing command reissues comprising the steps of:
    (a) initiating a command, at an originating one of the master devices having been granted control of the command bus, to a targeted one of the slave devices via the command bus;
    (b) generating a slave response signal at the targeted slave device, the slave response signal indicating that the targeted slave device is available to process the command; and
    (c) reissuing the command from the targeted slave device when the slave response signal fails to be generated by the generating step within a predetermined interval, the step of reissuing the command comprising the steps of:
        (i) storing the command, including an originating master identifier to identify the originating master device that initiated the command, at the targeted slave device;
        (ii) arbitrating, by the targeted slave device, for the command bus upon availability of the targeted slave device to process the command; and
        (iii) driving the command stored by the storing step, including the originating master identifier, onto the command bus.

10. The method of claim 9, wherein the step of initiating a command comprises the steps of:
    (i) requesting control of the command bus, by a requesting master device, from a bus arbiter;
    (ii) determining via the bus arbiter whether the command bus is available;
    (iii) granting the requesting master device control of the command bus by the bus arbiter, the requesting master device then being referred to as the originating one of the master devices; and
    (iv) driving the command onto the command bus at the originating master device.

11. The method of claim 9, further comprising the step of providing in the command at least an instruction, an address of the targeted slave, and the originating master identifier in an instruction field, an address field, and a tag field respectively.

12. The method of claim 11, wherein the step of storing the command comprises the step of storing one or more master identification bits in the tag field, wherein each combination of the one or more master identification bits corresponds to a different one of the plurality of master devices.

13. The method of claim 12, wherein the step of storing the command further comprises the step of storing a command sequence number, along with the one or more master identification bits, in the tag field of the command, wherein the command sequence number corresponds to a particular one of a group of one or more commands initiated by the originating master device.

14. The method of claim 9, wherein the step of generating the slave response signal comprises the step of generating a slave-acknowledge signal when the targeted slave device receives the command.

15. The method of claim 9, wherein the step of generating the slave response signal comprises the step of generating a slave-processing-complete signal when the targeted slave has completed processing of the command.

16. The method of claim 9, wherein the step of generating the slave response signal comprises the step of generating a slave-available signal when the targeted slave is available to begin processing the command.

17. The method of claim 9, wherein the step of driving the command comprises the step of driving an instruction, an address, and the originating master identifier onto the command bus, wherein the instruction, the address, and the originating master identifier are equivalent to an original instruction, an original address, and the originating master identifier as initiated by the originating master device.

18. The method of claim 17, further comprising the step of allowing the originating master device to proceed as if the originating master device itself, rather than the targeted slave device, had driven the command stored by the storing step onto the bus.

19. The method of claim 9, further comprising the step of reconfiguring the originating master identifier to equal a master identifier of a particular one of the plurality of master devices.

20. The method of claim 19, wherein the step of reconfiguring the originating master identifier comprises the step of reconfiguring the originating master identifier to equal the master identifier of the originating master device.

21. The method of claim 9, wherein the step of arbitrating by the targeted slave device comprises the steps of:
(i) requesting control of the command bus from a bus arbiter;
(ii) determining via the bus arbiter whether the command bus is available; and
(iii) granting the targeted slave device control of the command bus by the bus arbiter when the command bus is available.

22. The method of claim 9, further comprising the step of determining whether the targeted slave device is available to process the command, and wherein the step of arbitrating by the targeted slave device comprises the step of allowing the targeted slave to arbitrate for the command bus subsequent to a determination that the targeted slave device is available to process the command.

23. The method of claim 9, further comprising the step of determining the predetermined interval by monitoring a passage of time.

24. The method of claim 9, further comprising the step of determining the predetermined interval by monitoring the occurrence of a predetermined number of clock cycles.

25. The method of claim 9, further comprising the step of determining the predetermined interval by monitoring for the occurrence of a predetermined event.

26. A method for reissuing data transfer commands in a computer processing system having a plurality of masters and a plurality of slaves, and further having a command bus coupled to each one of the plurality of masters and slaves, the method comprising the steps of:
(a) arbitrating, by a requesting master, for control of the command bus;
(b) initiating a data transfer command at the requesting master to a targeted slave via the command bus upon receipt of a bus grant, the data transfer command comprising at least an instruction in an instruction field, a target address in an address field, and a bus identifier in a tag field;
(c) searching for the target address in data caches of the masters and slaves having the data caches;
(d) monitoring each of the masters and slaves having the data caches for the generation of a cache snoop signal within a predetermined interval, the cache snoop signal indicating whether the respective masters and slaves having the data caches are storing data having the target address;
(e) reissuing the data transfer command when any one of the cache snoop signals is not generated within the predetermined interval, the step of reissuing the data transfer command comprising the steps of:
(i) storing the data transfer command at a nonresponsive master/slave, the nonresponsive master/slave being the one of the masters and slaves that did not generate the cache snoop signal in the predetermined interval;
(ii) allowing the nonresponsive master/slave to arbitrate for control of the bus when it has determined whether its data cache is storing data having the target address;
(iii) driving the data transfer command stored by the storing step onto the command bus.

27. The method of claim 26, wherein the step of monitoring each of the masters and slaves for the generation of a cache snoop signal within a predetermined interval comprises the step of monitoring the time required for each of the masters and slaves to determine whether the target address is stored in its respective data cache, and comparing the time with the predetermined interval.

28. The method of claim 27, wherein the step of monitoring further comprises the step of generating an aggregate snoop signal indicative of whether any of the masters and slaves having the data caches are storing data at the target address, and returning the aggregate snoop signal to each of the masters and slaves.

29. The method of claim 28, wherein the step of reissuing the data transfer command further comprises the step of generating an aggregate delay signal when any one of the cache snoop signals is not generated within the predetermined interval, and returning the aggregate delay signal to each of the masters and slaves.

30. The method of claim 26, further comprising the step of coupling the command bus to a bridge bus, the bridge bus further being coupled to one or more other processing nodes, wherein each of the processing nodes comprises a separate computer processing system.

31. The method of claim 30, wherein:
(i) the step of initiating a data transfer command comprises the step of initiating the data transfer command at the requesting master to an external targeted slave, the external targeted slave residing in one of the other processing nodes;

(ii) the step of searching for the target address comprises the step of searching for the target address in external data caches of external masters and external slaves having the external data caches, the external masters and external slaves residing in the other processing nodes;

(iii) the step of monitoring comprises the step of monitoring each of the external masters and external slaves having the external data caches for the generation of an external cache snoop signal within the predetermined interval, the external cache snoop signal indicating whether the respective external masters and external slaves having the external data caches are storing data having the target address; and (iv) the step of reissuing the data transfer command comprises the step of reissuing the data transfer command when any one of the cache snoop signals and the external cache snoop signals is not generated within the predetermined interval.

32. The method of claim 26, wherein the step of driving the data transfer command comprises the step of driving the instruction, the target address, and the bus identifier originally initiated by the requesting master onto the command bus.

33. The method of claim 32, further comprising the step of allowing the requesting master to proceed as if the requesting master itself, rather than the nonresponsive master/slave, had driven the command stored by the storing step onto the command bus.

34. The method of claim 26, wherein the tag field comprises a master identification field and a command sequence field, and wherein the bus identifier comprises a master identification number corresponding to the requesting master in the master identification field, and wherein the bus identifier comprises a command sequence number corresponding to a particular one of the data transfer commands initiated by the requesting master in the command sequence field.

35. The method of claim 26, wherein the data transfer command is selected from the group comprising a data read command and a data write command.

* * * * *